United States Patent [19]

Pond

[11] Patent Number: 5,702,667
[45] Date of Patent: Dec. 30, 1997

[54] METHOD AND APPARATUS FOR HEAT TREATING A BUSHING

[75] Inventor: Dennis C. Pond, Tremont, Ill.

[73] Assignee: Caterpillar Inc., Peoria, Ill.

[21] Appl. No.: 698,836

[22] Filed: Aug. 16, 1996

[51] Int. Cl.$^6$ ...................................... H05B 6/40

[52] U.S. Cl. ............... 266/249; 266/252; 219/635; 219/676

[58] Field of Search .................... 266/249, 252; 219/602, 635, 674, 676

[56] References Cited

U.S. PATENT DOCUMENTS

| | | | |
|---|---|---|---|
| 3,560,692 | 2/1971 | Briles | 219/602 |
| 4,542,272 | 9/1985 | Hubbard | 219/676 |

Primary Examiner—George Wyszomierski
Attorney, Agent, or Firm—Larry G. Cain

[57] ABSTRACT

Conventional methods for heat treating cylindrical components such as track bushings involve multiple steps. For example, many such methods consist of carburizing, cooling, induction-hardening, quenching, and tempering. The conventional methods have proved to be costly because different heat treating apparatus are required. This causes duplicate handling and wasted manufacturing time. The present invention provides an apparatus 30 for heat treating a bushing 10 simultaneously from an outer peripheral surface 12 and the pair of inner circumferential surfaces 20.

3 Claims, 6 Drawing Sheets

Fig_3_

Fig_7_
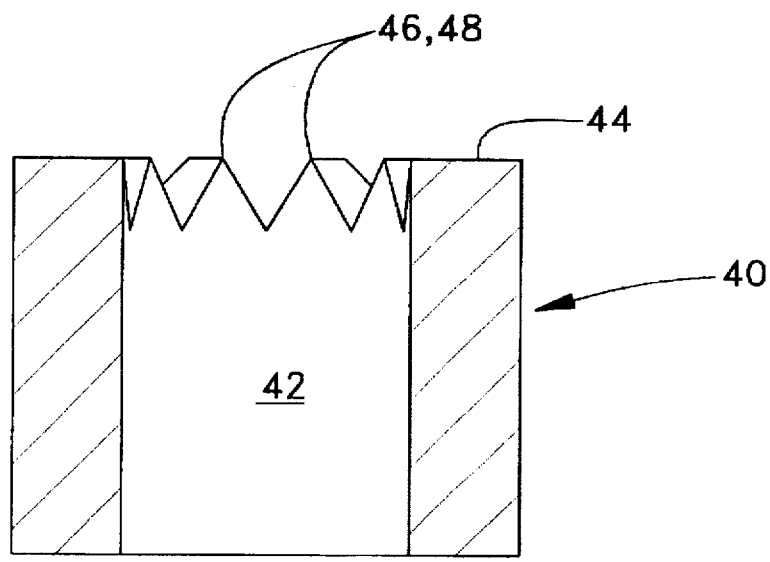
Fig_8_
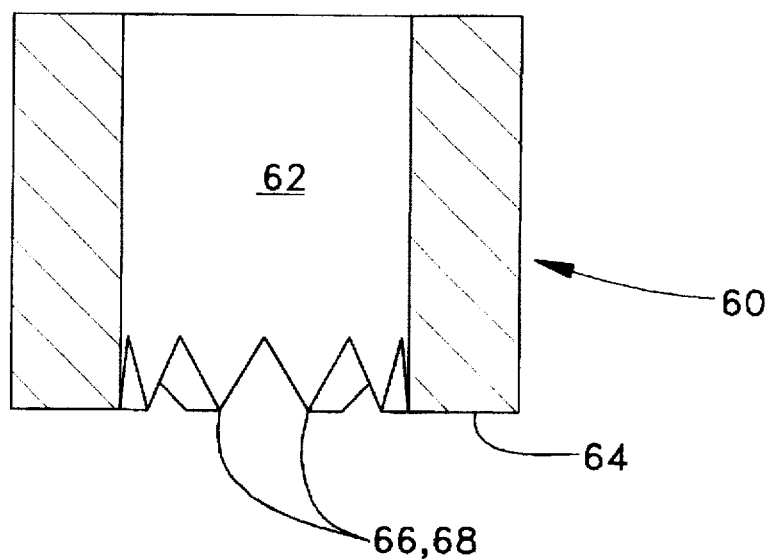

METHOD AND APPARATUS FOR HEAT TREATING A BUSHING

TECHNICAL FIELD

This invention relates to heat treating and more particularly to a method and apparatus for simultaneously heat treating a bushing from the outer peripheral surface and inner circumferential surface.

BACKGROUND ART

Known track assemblies for endless track laying machines include a plurality of links with laterally overlapping ends joined by bushings, pins, oil seals that are interposed between the ends of the bushings and the links, and track shoes which are fixed with bolts and nuts on the links.

The main causes of damage to the bushings are wear and fatigue cracks. In an effort to increase bushing life, the outer peripheral surface and inner circumferential surfaces are hardened to resist wear. The outer peripheral surface of the bushing requires a high hardness and a hardened depth because it is the surface that engages the sprocket for driving the track. The center of the inner circumferential surface requires high fatigue resistance because of the stresses created by the load transfer path from the sprocket into the bushing. The end portions of the inner circumferential surface require high surface hardness because of high stress caused by contact between the bushing and the pin.

In order to meet such severe conditions, bushings for tracks are given various heat treatments.

An example of a method of heat treating a bushing is disclosed in U.S. Pat. No. 5,032,192 issued Jul. 6, 1991 to Tsuchiya et al. The above patent uses a medium carbon steel for the bushing material. The steps for the heat treating process is first comprised of carburizing the bushing and then cooling to ambient temperature. After which, the outer peripheral surface of the bushing is induction-heated so that an entire wall cross-section is heated to a quenching temperature. The entire bushing is then cooled by a quenching liquid so that the bushing is evenly hardened. After hardening, the bushing is tempered.

Another example of a method of heat treating a bushing is disclosed in U.S. Pat. No. 5,049,207 issued Sep. 17, 1991 to Sahara et al. This example also uses a medium carbon steel for the bushing. In this process, the bushing is first induction hardened from the outer peripheral surface until the inner circumferential surface reaches the austenitic transformation temperature of 1540 degrees Fahrenheit. Then, the bushing is cooled by quenching across the entire thickness of the bushing. The bushing is then tempered in a furnace between a specified temperature range so as not to impair the effective hardness acquired by the heat treating process. The last step of this process is to induction temper the bushing from the inner circumferential surface using the conductive heat to temper the outer peripheral surface at a temperature lower than that on the inner circumferential surface.

The methods described above require multiple heating steps, moving the bushing from one heating apparatus to another, and a considerable consumption of manufacturing time. The result being increased labor and manufacturing cost, and a waste of energy and resources.

The present invention is directed to overcoming one or more of the problems as set forth above.

DISCLOSURE OF THE INVENTION

In one aspect of the invention, a method for heat treating a bushing in generally a simultaneous operation is provided.

The method comprises concentrically locating the bushing with respect to a central axis. The bushing is then supported by the ends and is rotated in a circumferential direction about the central axis. One of the bushing and the heating coils are moved relative to the other in an axial direction. As the bushing is being rotated and axially moved it is heated by induction on the outer peripheral surface, the inner circumferential surfaces, and the pair of ends. Finally the bushing is cooled by quenching.

In another aspect of the invention, an apparatus is provided for heat treating a bushing. The apparatus includes locating means mounted on a machine frame for positioning the bushing with respect to a central axis. A driver that supports one end of the bushing is rotatably mounted on a first carriage. The first carriage is attached to the machine frame. A quill that supports the bushing from one end is rotatably mounted on a tailstock. The tailstock is reciprocably mounted on a plurality ways which are attached to the machine frame. A first induction coil that is used for heating the bushing on the inner circumferential surface, is supported by the tailstock in axial alignment with the bore of the quill. A second induction coil that is used for heating the bushing from the outer peripheral surface, is supported by the tailstock and is axially aligned around the outer diameter of the quill. An inner cooling ring and an outer cooling ring are also supported from the tailstock for quenching the bushing after the induction heating takes place.

BRIEF DESCRIPTION OF THE DRAWINGS

FIG. 7 is a cut away view in section of the serrated drive; and FIG. 8 is a cut away view in section of the serrated quill.

BEST MODE FOR CARRYING OUT THE INVENTION

Figure 1:
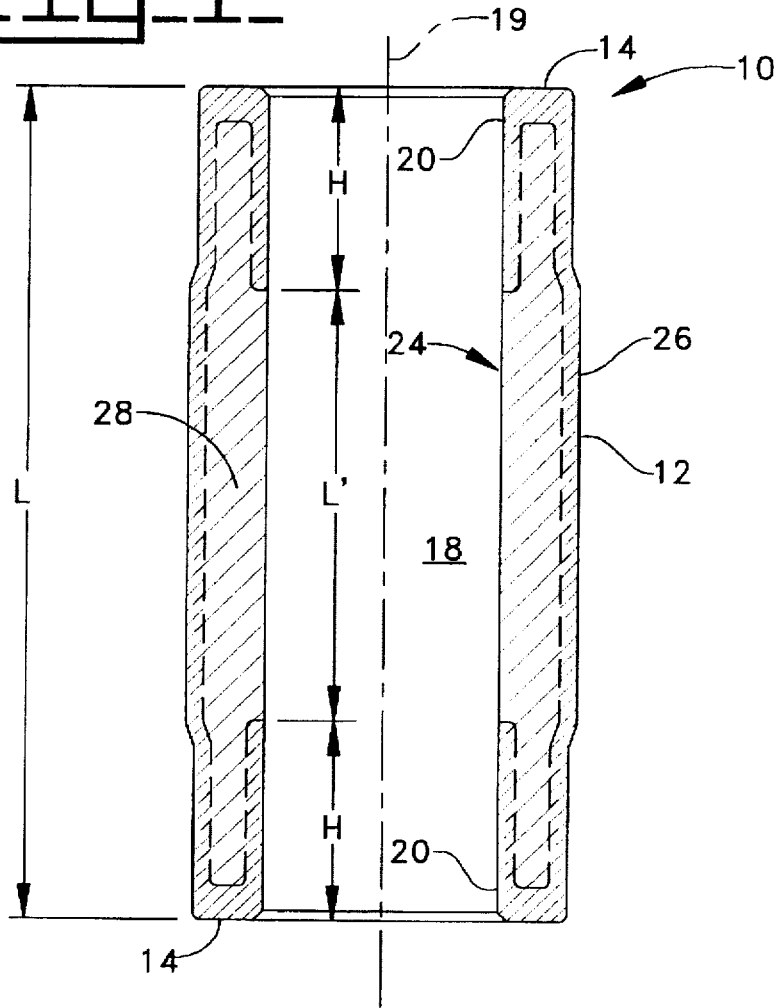
FIG. 1 is an axially sectioned view of a bushing employing the present invention.
Figure 2:
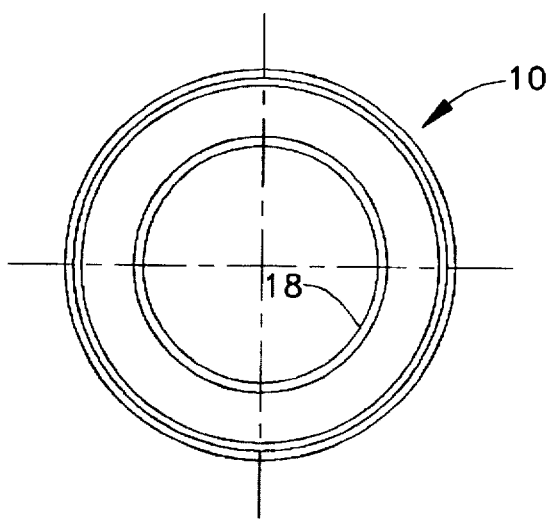
FIG. 2 is an end view of a bushing employing the present invention.

Referring to the FIGS. 1 and 2, a bushing 10 is illustrated, to which the method and apparatus of the invention is applied. The bushing 10 is formed of substantially a cylindrical configuration having an outer stepped peripheral surface 12 extending generally the full length of the bushing 10, a pair of ends 14, a longitudinal bore 18 extending between the pair of ends 14, and a central axis 19. The longitudinal bore 18 has a pair of inner circumferential surfaces 20 and a center portion 24 positioned intermediate the pair of inner circumferential surfaces 20. A hardened layer 26 extends inwards approximately 2.0 to 10.0 mm thick from the pair of inner circumferential surfaces 20, the pair of ends 14, and the outer stepped peripheral surface 12. A soft core 28 is positioned juxtaposed to the center portion 24 and intermediate the hardened layer 26.

The bushing has a length "L" extending between the pair of ends 14 and an outer diameter "D". The pair of inner circumferential surfaces 20 are substantially the same length "H" with the remaining center portion 28 having a length of "L'".

Preferably the bushing 10 is manufactured from a cold rolled bar stock of medium carbon steel alloy. The raw material is similar to the specification S.A.E. 1040 or 1056 and has a chemical composition shown in Table 1.

TABLE 1

| Chemical Composition of Material (wt %) | | | | |
|---|---|---|---|---|
| C | Mn | P | S | Si |
| 0.40–0.58 | 0.50–0.80 | 0.025 Max | 0.025–0.050 | 0.15–0.35 |

The bar stock is saw cut to length slightly longer than the bushing length "L" and is machined to final dimensions. After machining in a conventional manner the bushing 10 is ready for the heat treating process.

Figure 3:
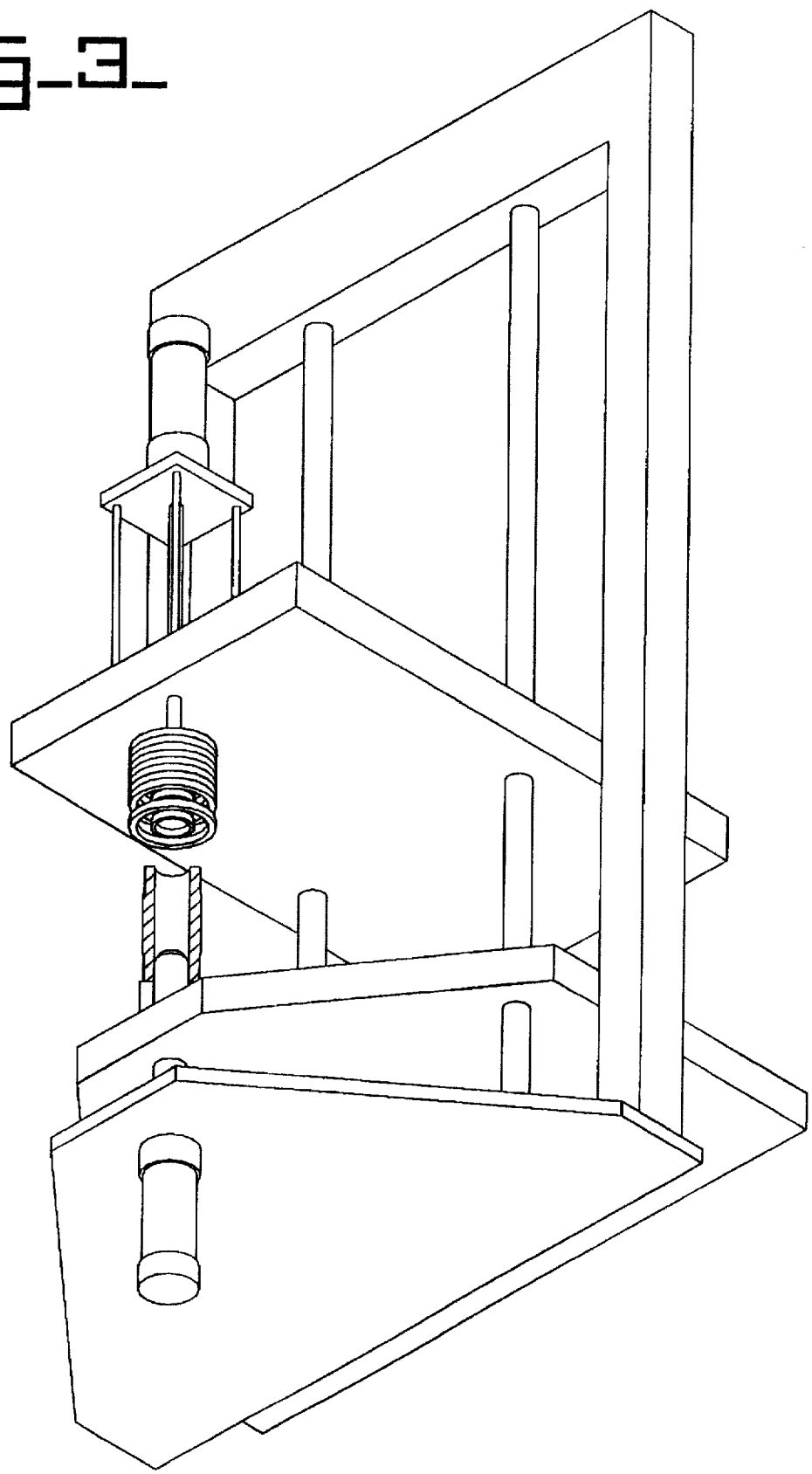
FIG. 3 is a perspective view of the apparatus employing the present invention for heat treating the bushing.
Figure 4:
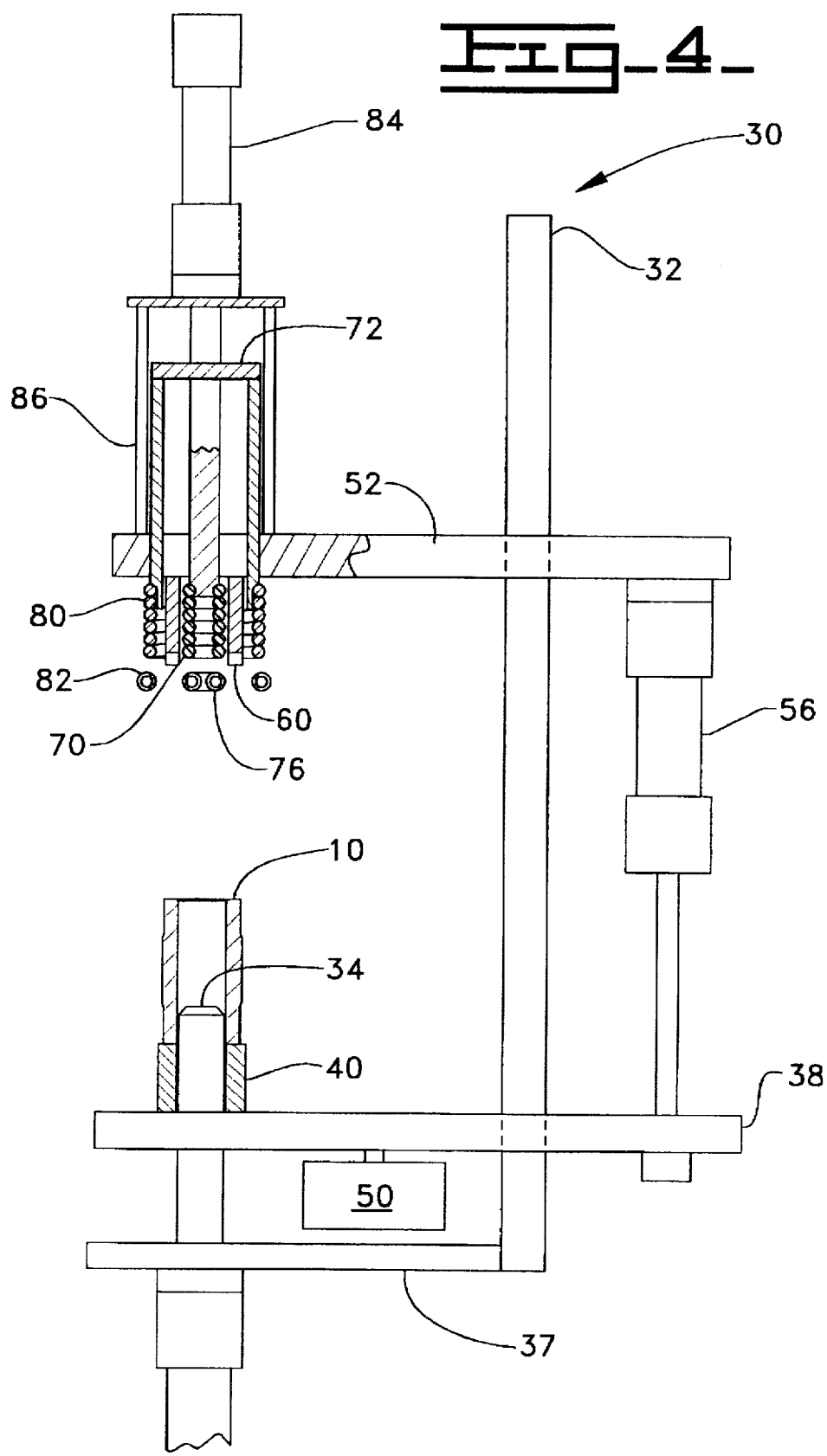
FIG. 4 is a side elevation view of the apparatus employing the present invention for heat treating the bushing.

In FIGS. 3, an apparatus 30 is shown for heat treating the bushing 10. The apparatus 30 includes a machine frame 32 which may be mounted on a suitable base or other support not shown. A means for locating 34, the bushing 10, is connected in a conventional manner to a first hydraulic cylinder 36 as best shown in FIG. 4. In this application the means for locating 34 is a solid locator 35, it should also be recognized that other types of locators could be used such as expandable collets, hydraulic arbors, and the like. The first hydraulic cylinder 36 is mounted to a bracket 37 attached to the machine frame 32.

A carriage 38 is attached to the machine frame 32.

A driver 40 is rotatably mounted on the carriage 38. The driver 40 is generally cylindrical in shape and defines a bore 42 and an end 44. The locator 34 is in axial alignment with and slidably disposed within the bore 42 of the driver 40. The end 44 of the driver 40 has an intermittent surface 46 as seen in FIG. 7. In this application, an intermittent surface 46 such as a serrated surface 48 is provided on the end 44 for supporting the bushing 10 from one of the ends 14. The driver 40 is operatively connected to a hydraulic motor 50.

A tailstock 52 is mounted on a plurality of ways 54 which are secured to the machine frame 32. A second hydraulic cylinder 56 is secured to the tailstock 52 and to the carriage 38.

A quill 60 is rotatably mounted on the tailstock 52. The quill 60 is generally cylindrical in shape defining a longitudinal bore 62 and an end 64 as shown in FIG. 8. The end 64 of the quill 60 has an intermittent surface 66. In this application, an intermittent surface 66 such as a serrated surface 68 is provided on the end 64 for supporting the bushing 10 from one of the ends 14.

A first induction coil 70 is supported by a support plate 72 in axial alignment with the longitudinal bore 62 of the quill 60 and the longitudinal bore 18 of the bushing 10. The first induction coil 70 comprises a plurality of turns formed to a predetermined diameter smaller than the longitudinal bore 18 of the bushing 10. The first induction coil 70 is connected to a high frequency power supply (not shown). Also supported by the support plate 72 and suspended through the center of the first induction coil 70 is an inner cooling ring 76 which is also in axial alignment with the longitudinal bore 62 of the quill 60 and the longitudinal bore 18 of the bushing 10. The inner cooling ring 76 is in a preestablished location and spaced relationship to the first induction coil 90 and has a coolant 78 therein. For example, in this application the inner cooling ring 76 axially extends about 25 mm from the first induction coil 70, and approximately 100 mm above one of the pair of ends 14 of the bushing 10, with the tailstock 52 in its initial position.

A second induction coil 80 is supported by the support plate 72 in axial alignment with the outer peripheral surface 12 of the bushing 10. The second induction coil 80 comprises a plurality of turns formed to a predetermined diameter larger than the outer peripheral surface 12 of the bushing 10 and the quill 60. The second induction coil 80 is connected to the high frequency power supply (not shown). Also supported by the support plate 72 and suspended in a preestablished location and spaced relationship to the second induction coil 80 is an outer cooling ring 82 having a coolant 78 therein. For example, in this application, the outer cooling ring 82 axially extends about 25 mm from the second induction coil 80 and approximately 100 mm above one of the pair of ends 14 of the bushing 10, with the tailstock 52 in its initial position. In this position, each of the inner cooling ring 76 and the outer cooling ring 82 are axially aligned.

A third hydraulic cylinder 84 is mounted to the tailstock 52 by a plurality of standoffs 86. The third hydraulic cylinder 84 is connected to the support plate 72 in a conventional manner.

Industrial Applicability

Figure 5:
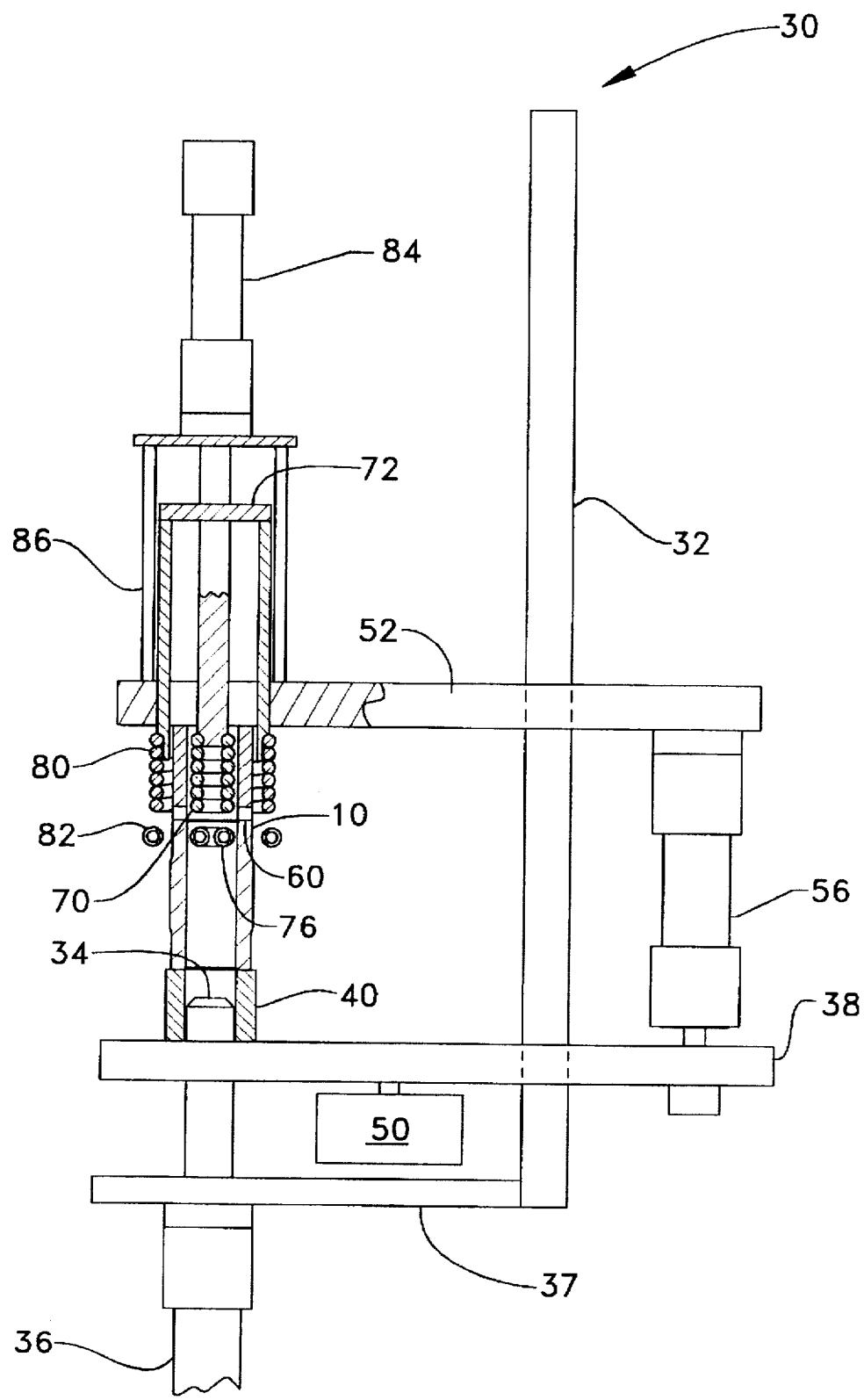
FIG. 5 is a side elevation view of the apparatus employing the present invention for heat treating the bushing.
Figure 6:
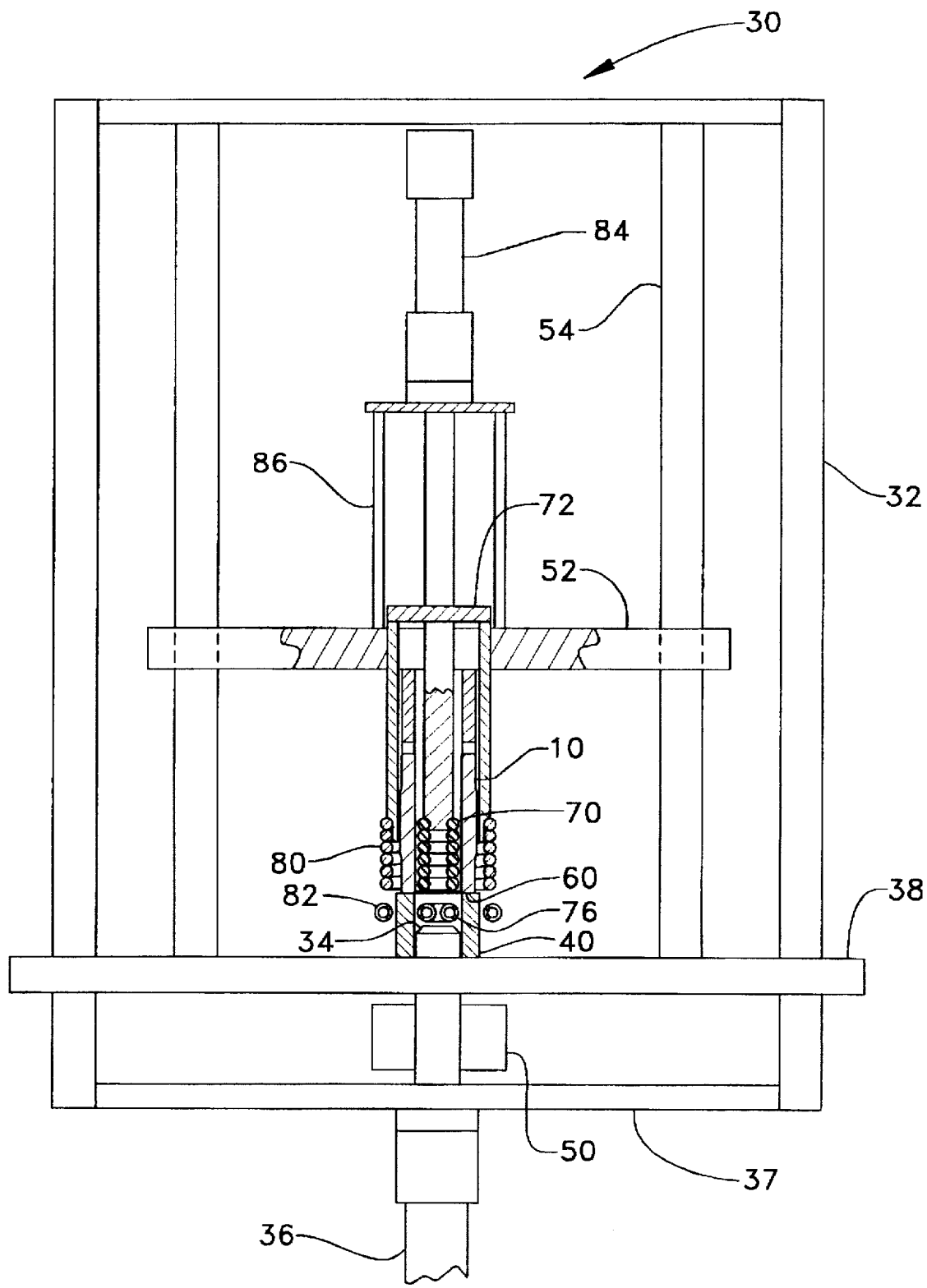
FIG. 6 is a front elevation view of the apparatus employing the present invention for heat treating the bushing.

In operation the apparatus 30 would be set in the factory on a machine base or table (not shown) in a working relationship with any conventional automation system(not shown) for introducing bushings 10 to a machine. To begin the operation, a bushing 10 is placed over the means for locating 34 in contacting relationship to one of the pair of inner circumferential surfaces 20 positioning the bushing 10 with respect to the central axis 19. The bushing 10 is supported at one of the pair of ends 14 coming in contact with the intermittent surface 46 of the driver 40. The second hydraulic cylinder 56 is actuated in a conventional manner moving the tailstock 52 axially along the plurality of ways 54 causing the intermittent surface 66 of the quill 60 to contact one of the pair of ends 14 of the bushing 10 as best seen in FIG. 5. After pressure is reached within the second hydraulic cylinder 56, the bushing 10 is supported at the pair of ends 14 between the driver 40 and the quill 60. The first hydraulic cylinder 36 is then actuated retracting the means for locating 34 from the longitudinal bore 18 of the bushing 10. The third hydraulic cylinder 84 is then actuated is axially moving the inner and the outer cooling rings 76, 82 and the first and the second induction coils 70, 80 through the longitudinal bore 18 of the bushing 10. When the inner and the outer cooling rings 76, 82 have moved through both of the pair of ends 14 and extend beyond the bushing 10 about 25 mm the third hydraulic cylinder 84 is de-actuated stopping the axial movement as seen in FIG. 6. The hydraulic motor 50 is then actuated rotating the driver 40, the bushing 10, and the quill 60 in unison. The first induction coil 70 and the second induction coil 80 are then energized. After a short dwell the third hydraulic cylinder 84 is again actuated moving the inner and the outer cooling rings 76, 82 and the first and the second induction coils 70, 80 axially upward. At this point the coolant 78 is supplied to the inner and the outer cooling rings 76, 82. The coolant 78 employed can be one of water, soluble oil, and polymer quenchants. The short dwell assures that the outer peripheral surface 12, one of the pair of ends 14 and the inner circumferential surface 20 reach the austenitizing temperature of about 1540 degrees Fahrenheit. The second induction coil 80 remains energized during the entire axial travel. The first induction coil 70 remains energized only during the dimension "H" of the inner circumferential surface 20 has been reached. When the axial movement of the inner and the outer cooling rings 76, 82 and the first and the second induction coils 70, 80 causes the first induction coil 70 to travel through the "L'" dimension of the bushing 10, the first induction coil 70 is again energized. The axial movement of the inner and the outer cooling rings 76, 82 and the first and the second induction coils 70, 80 continues until the inner induction coil 70 moves through the remaining dimension "H" of the After the quenching is completed the third hydraulic cylinder 84 is retracted completely. At this point the hydraulic motor is deactuated stopping the rotation of the driver 40, the bushing 10, and the quill 60. The second hydraulic cylinder 56 is then actuated moving the tailstock 52 and the quill 60 axially upwards along the plurality of ways 54. The heat treated bushing 10 is removed from the apparatus 30 by any conventional automation system (not shown) completing the process. Thus, providing a more efficient cost-effective method for heat treating a bushing can be utilized.

Other aspects, objects and advantages of this invention can be obtained from a study of the drawings, the disclosure and the appended claims.

I claim:

1. An apparatus for heat treating a bushing, said apparatus comprising:

a machine frame;

means for locating said bushing concentrically with respect to a central axis, said means for locating mounted on said machine frame;

a carriage being attached to said machine frame;

a driver having a generally cylindrical configuration and defining a bore, said bore radially supporting the bushing, said driver supporting one of a pair of ends of the bushing, said driver being rotatably mounted to the carriage, and being rotatably and slidably disposed about said means for locating;

a plurality of ways being mounted to said machine frame;

a tailstock being connected to said plurality of ways, said tailstock being movable along said plurality of ways;

a quill having a generally cylindrical configuration and defining a bore, said bore radially supporting the bushing, said quill supporting one of the pair of ends, said quill being rotatably mounted to the tailstock;

a first induction heating coil having a plurality of turns formed to a diameter smaller than the longitudinal bore of the bushing and being supported by the support plate;

a second induction heating coil having a plurality of turns formed to a diameter larger than the outer peripheral surface of the bushing and being supported by the support plate;

an inner cooling ring being supported by the support plate and suspended through the center of the first induction coil in a spaced relationship to the first induction coil; and an outer cooling ring being supported by the support plate and suspended in a spaced relationship to the second induction coil.

2. The apparatus as set forth in claim 1, wherein said means for locating is a solid locator that extends axially into the longitudinal bore of the bushing.

3. The apparatus as set forth in claim 1, including a means for controlling the movement of the tailstock along the plurality of ways, the movement of the locating means the movement of the first and the second induction coils and the rotation of the driver.

* * * * *